United States Patent [19]

Diffut

[11] Patent Number: 6,029,094
[45] Date of Patent: Feb. 22, 2000

[54] SHOWER TEMPERATURE AND FLOW RATE MEMORY CONTROLLER

[76] Inventor: Eduardo Diffut, 2124 Quimby Ave., Bronx, N.Y. 10473

[21] Appl. No.: 08/950,052

[22] Filed: Oct. 14, 1997

[51] Int. Cl.[7] .................................................. G05B 13/02
[52] U.S. Cl. ................................ 700/32; 700/18; 700/25; 700/20; 700/27; 236/12.12
[58] Field of Search ........................... 236/12.12; 700/32, 700/18, 25, 20, 27

[56] References Cited

U.S. PATENT DOCUMENTS

| | | | |
|---|---|---|---|
| 4,682,728 | 7/1987 | Oudenhoven et al. | 236/12.12 |
| 4,696,428 | 9/1987 | Shakalis | 236/12.12 |
| 4,854,498 | 8/1989 | Stayton | 236/12.12 |
| 4,901,915 | 2/1990 | Sakakibara | 236/12.12 |
| 4,945,943 | 8/1990 | Cogger | 137/360 |
| 4,969,598 | 11/1990 | Garris | 236/12.12 |
| 4,974,636 | 12/1990 | Cogger | 137/625.17 |
| 5,294,045 | 3/1994 | Harris | 236/12.12 |
| 5,358,177 | 10/1994 | Cashmore | 236/12.12 |

Primary Examiner—William Grant
Assistant Examiner—McDieunel Marc

[57] ABSTRACT

A shower temperature and flow rate memory controller is provided including a cold and hot water valve coupled to a cold and hot water inlet line, respectively, and further connected to a shower head of a shower for allowing a controlled rate of flow of cold and hot water to the shower head upon the actuation thereof. Next provided is a temperature sensor coupled a main inlet line connected to the shower head down stream of the water valves. The temperature sensor is adapted to generate a current temperature signal indicative of a temperature of water within the main inlet line. Next provided is a housing mounted within the shower. Memory is situated within the housing for storing a plurality of settings each consisting of a predetermined temperature set signal. Associated therewith is a plurality of memory buttons situated on the housing and adapted to transmit an associated one of the settings stored within the memory. Finally, a controller is adapted to actuate the water valves upon the depression of at least one of the memory buttons and further control the flow rate of water through the water valves such that a temperature represented by the current temperature signal is equal to a temperature represented by the predetermined temperature set signal associated with the setting of the memory button depressed.

1 Claim, 4 Drawing Sheets

SHOWER TEMPERATURE AND FLOW RATE MEMORY CONTROLLER

BACKGROUND OF THE INVENTION

1. Field of the Invention

The present invention relates to a shower temperature and flow rate memory controller and more particularly pertains to storing a plurality of preset combinations of temperatures and flow rates of a shower that are implemented by the depression of an associated button.

2. Description of the Prior Art

The use of shower controllers is known in the prior art. More specifically, shower controllers heretofore devised and utilized for the purpose of controlling a temperature and flow rate associated with a shower are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,923,116; U.S. Pat. No. 4,420,811; U.S. Pat. No. Des. 349,151; U.S. Pat. No. 4,563,780; U.S. Pat. No. 4,854,498; and U.S. Pat. No. 4,869,427.

In this respect, the shower temperature and flow rate memory controller according to the present invention substantially departs from the conventional concepts and designs of the prior art, and in so doing provides an apparatus primarily developed for the purpose of storing a plurality of preset combinations of temperatures and flow rates of a shower that are implemented by the depression of an associated button.

Therefore, it can be appreciated that there exists a continuing need for a new and improved shower temperature and flow rate memory controller which can be used for storing a plurality of preset combinations of temperatures and flow rates of a shower that are implemented by the depression of an associated button. In this regard, the present invention substantially fulfills this need.

SUMMARY OF THE INVENTION

In view of the foregoing disadvantages inherent in the known types of shower controllers now present in the prior art, the present invention provides an improved shower temperature and flow rate memory controller. As such, the general purpose of the present invention, which will be described subsequently in greater detail, is to provide a new and improved shower temperature and flow rate memory controller which has all the advantages of the prior art and none of the disadvantages.

To attain this, the present invention essentially comprises a hot water valve coupled to a hot water inlet line which is in turn connected to a shower head of a shower. Note FIG. 1. In use, the hot water valve is adapted for allowing a controlled rate of flow of hot water to the shower head upon the actuation thereof. Associated therewith is a cold water valve coupled to a cold water inlet line which is connected to the shower head of the shower. Upon the actuation thereof, the cold water valve is adapted for allowing a controlled rate of flow of cold water to the shower head, similar to the hot water valve. Also included is a temperature sensor coupled a main inlet line. The main inlet line is connected between the hot and cold water lines and the shower head down stream of the water valves. The temperature sensor serves to generate a current temperature signal indicative of a temperature of water within the main inlet line. A flow rate sensor is also coupled to the main inlet line down stream of the water valves. During operation, the flow rate sensor functions to generate a current flow rate signal indicative of a flow rate of the water within the main inlet line. As shown in FIGS. 1 & 2, a housing is provided having a rectilinear configuration with a front face, a rear face, and a periphery formed therebetween thereby defining an interior space. The housing is preferably mounted within the shower. Situated on the front face of the housing is a temperature display for displaying a plurality of numerals upon the receipt thereof. Such numerals are indicative of a temperature corresponding to a temperature signal. Situated adjacent the temperature display is a temperature increase switch. The temperature increase switch is adapted to transmit a temperature increase signal upon the depression thereof. Associated therewith is a temperature decrease switch situated on the front face of the housing and adapted to transmit a temperature decrease signal upon the depression thereof. Situated adjacent the temperature display is a flow rate display for displaying a plurality of numerals upon the receipt thereof. Such numerals are indicative of a flow rate corresponding to a flow rate signal. Situated adjacent the flow rate display is a flow rate increase switch. The flow rate increase switch is adapted to transmit a flow rate increase signal upon the depression thereof. Associated therewith is a flow rate decrease switch situated on the front face of the housing and adapted to transmit a flow rate decrease signal upon the depression thereof. As shown in FIG. 3, a memory means is provided. Such memory means is situated within the interior space of the housing. During use, the memory means is adapted for storing a plurality of settings each consisting of a predetermined flow rate set signal and a predetermined temperature set signal. Associated therewith is a plurality of memory buttons also situated on the front face of the housing. The memory buttons are included for transmitting an associated one of the settings stored within the memory means. As shown in FIG. 2, a deactivation button is situated on the front face of the housing for transmitting a deactivation signal upon the depression thereof. Finally, a control means is connected between the water valves, temperature sensor, flow rate sensor, displays, increase switches, decrease switches, memory means, memory buttons, and deactivation button. During use, the control means is adapted to actuate the water valves upon the depression of at least one of the memory buttons. After such actuation, the control means governs the water valves to control the flow rate of water through the water valves such that a temperature and a flow rate represented by the current temperature signal and current flow rate signal, respectively, are equal to a temperature and a flow rate represented by the predetermined temperature set signal and the predetermined flow rate set signal associated with the settings of the memory button depressed. After the actuation of the water valves, the control means is further adapted to control the flow rate of water through the water valves in a manner similar to that discussed hereinabove upon the receipt of the temperature increase signal and the flow rate increase signal. The difference in such operation, however, is that a temperature and a flow rate represented by the current temperature signal and the current flow rate signal, respectively, is controlled to be greater than a temperature and a flow rate represented by the predetermined temperature set signal and the predetermined flow rate set signal associated with the settings of the memory button. It should be noted that the control means also functions to control the water valves so that a current temperature and flow rate are less than determined by the settings upon the receipt of the temperature decrease signal and the flow rate decrease signal. Further during use, the control means ceases the actuation of the water valves upon the receipt of the deactivation signal, thereby allowing the ceasing of the water flow. Also, the current temperature signal and the current flow rate signal are transmitted to the temperature display and the flow rate display, respectively whenever the water valves are actuated.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shower temperature and flow rate memory controller which has all the advantages of the prior art shower controllers and none of the disadvantages.

It is another object of the present invention to provide a new and improved shower temperature and flow rate memory controller which may be easily and efficiently manufactured and marketed.

It is a further object of the present invention to provide a new and improved shower temperature and flow rate memory controller which is of a durable and reliable construction.

An even further object of the present invention is to provide a new and improved shower temperature and flow rate memory controller which is susceptible of a low cost of manufacture with regard to both materials and labor, and which accordingly is then susceptible of low prices of sale to the consuming public, thereby making such shower temperature and flow rate memory controller economically available to the buying public.

Still yet another object of the present invention is to provide a new and improved shower temperature and flow rate memory controller which provides in the apparatuses and methods of the prior art some of the advantages thereof, while simultaneously overcoming some of the disadvantages normally associated therewith.

Still another object of the present invention is to store a plurality of preset combinations of temperatures and flow rates of a shower that are implemented by the depression of an associated button.

Lastly, it is an object of the present invention to provide a new and improved shower temperature and flow rate memory controller including a cold and hot water valve coupled to a cold and hot water inlet line, respectively, and further connected to a shower head of a shower for allowing a controlled rate of flow of cold and hot water to the shower head upon the actuation thereof. Next provided is a temperature sensor coupled a main inlet line connected to the shower head down stream of the water valves. The temperature sensor is adapted to generate a current temperature signal indicative of a temperature of water within the main inlet line. Next provided is a housing mounted within the shower. Memory is situated within the housing for storing a plurality of settings each consisting of a predetermined temperature set signal. Associated therewith is a plurality of memory buttons situated on the housing and adapted to transmit an associated one of the settings stored within the memory. Finally, a controller is adapted to actuate the water valves upon the depression of at least one of the memory buttons and further control the flow rate of water through the water valves such that a temperature represented by the current temperature signal is equal to a temperature represented by the predetermined temperature set signal associated with the setting of the memory button depressed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
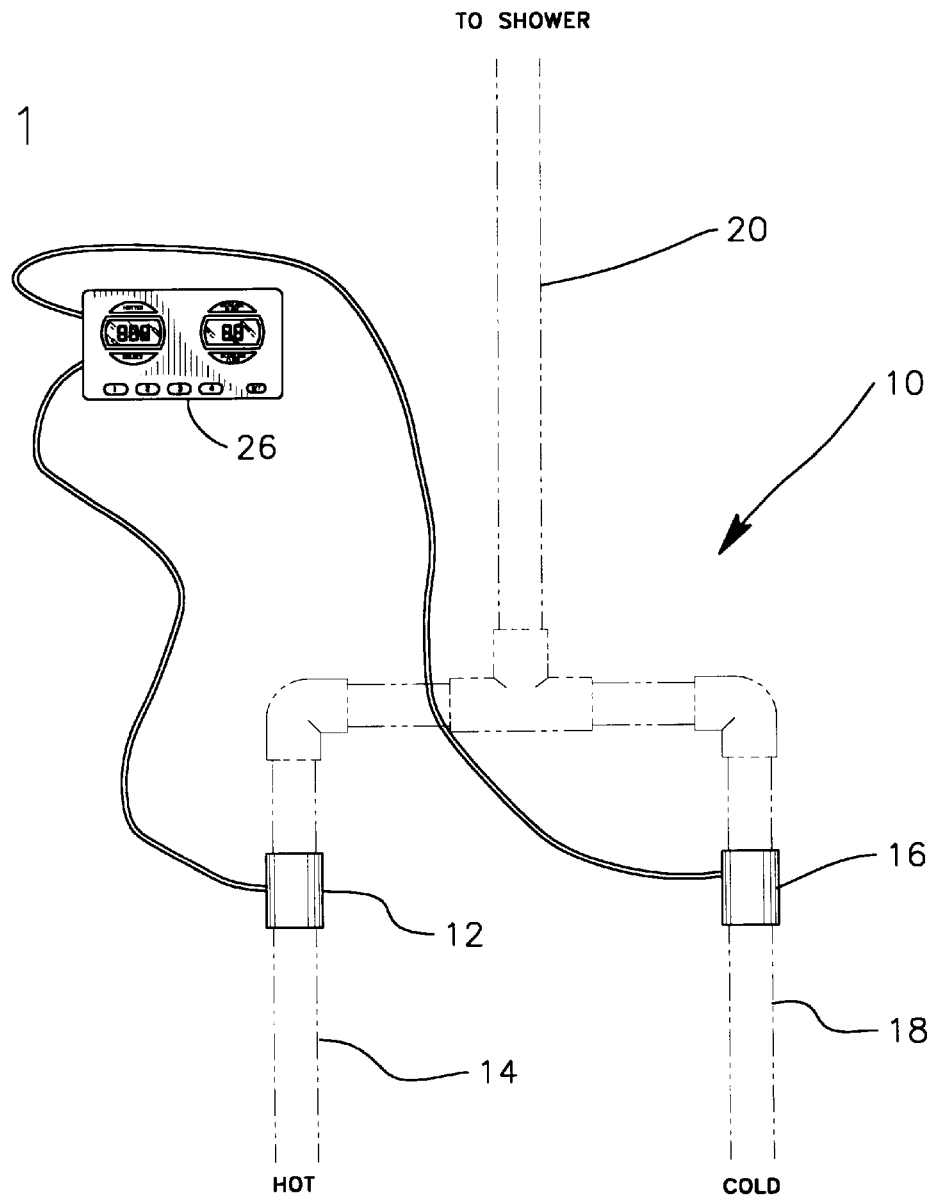
FIG. 1 is a perspective illustration of the preferred embodiment of the shower temperature and flow rate memory controller constructed in accordance with the principles of the present invention.

With reference now to the drawings, and in particular to FIG. 1 thereof, a new and improved shower temperature and flow rate memory controller embodying the principles and concepts of the present invention and generally designated by the reference numeral 10 will be described.

The present invention, the new and improved shower temperature and flow rate memory controller, is comprised of a plurality of components. Such components in their broadest context include water valves, displays, sensors, increase and decrease switches, memory means, and control means. Such components are individually configured and correlated with respect to each other so as to attain the desired objective.

More specifically, it will be noted that the system 10 of the present invention includes a hot water valve 12 coupled to a hot water inlet line 14 which is in turn connected to a shower head of a shower. Note FIG. 1. In use, the hot water valve is adapted for allowing a controlled rate of flow of hot water to the shower head upon the actuation thereof. Associated therewith is a cold water valve 16 coupled to a cold water inlet line 18 which is connected to the shower head of the shower. Upon the actuation thereof, the cold water valve is adapted for allowing a controlled rate of flow of cold water to the shower head, similar to the hot water valve.

Figure 3:
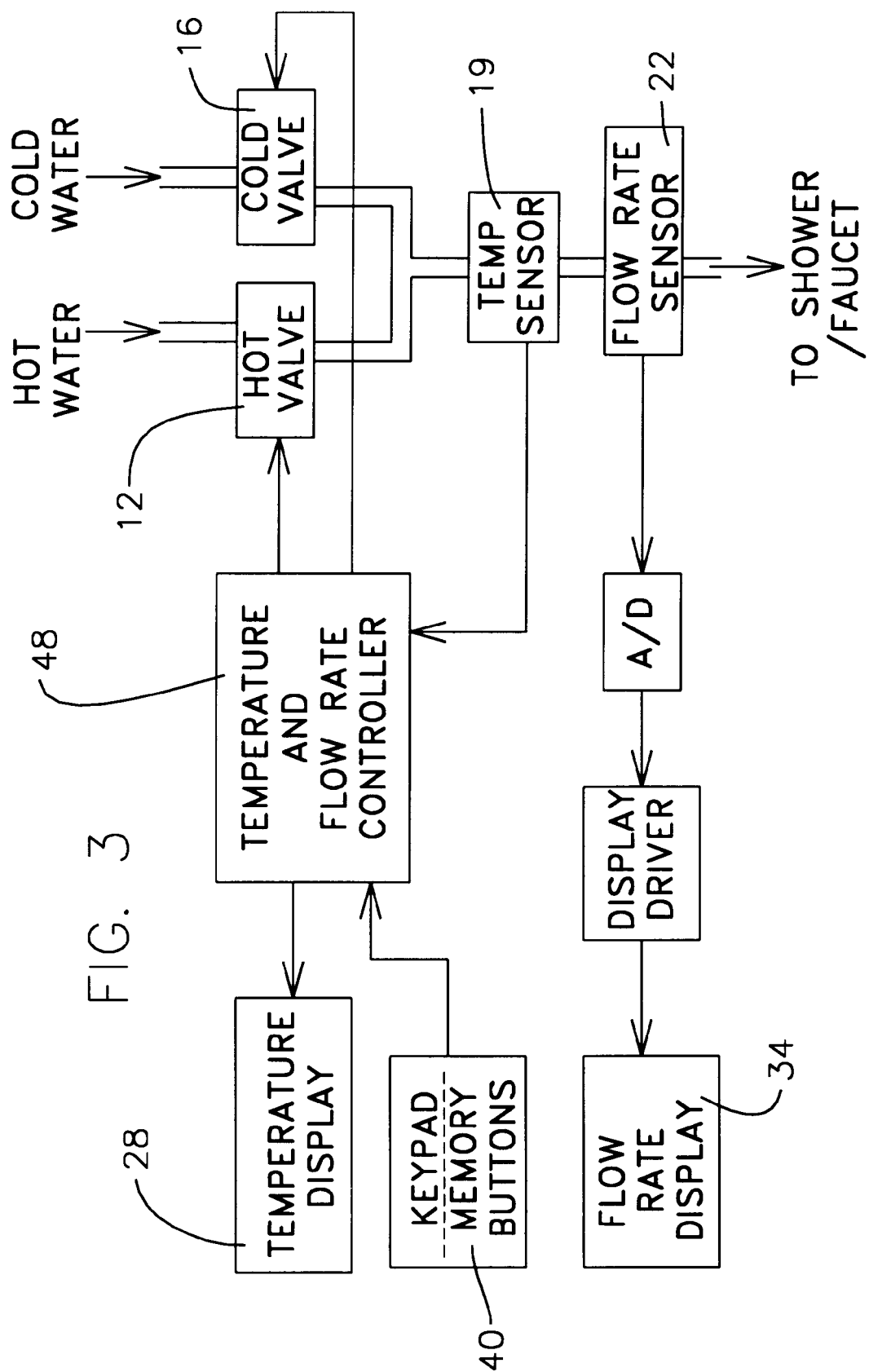
FIG. 3 is a schematic diagram of the present invention.
Figure 4:
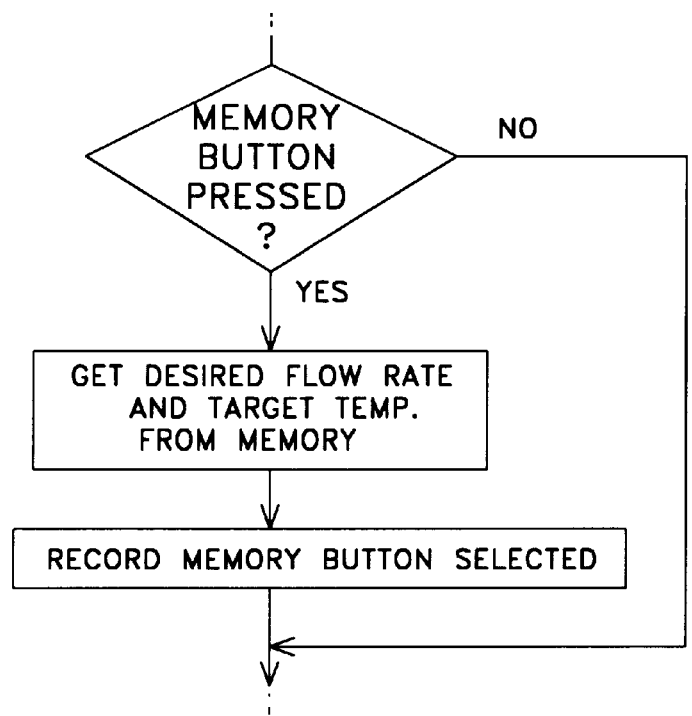
FIG. 4 is a flow chart that depicts the operation associated with the memory buttons of the present invention.

Also included is a temperature sensor 19 coupled within a main inlet line 20. The main inlet line is connected between the hot and cold water lines and the shower head down stream of the water valves. The temperature sensor serves to generate a current temperature signal indicative of a current temperature of water within the main inlet line. A flow rate sensor 22 is also coupled to the main inlet line down stream of the water valves. During operation, the flow rate sensor functions to generate a current flow rate signal indicative of a current flow rate of the water within the main inlet line. As shown in FIG. 3, the flow rate sensor ideally comprises an analog to digital converter and a display driver for sampling and digitally displaying analog flow rate signals detected by a flow rate sensor.

Figure 2:
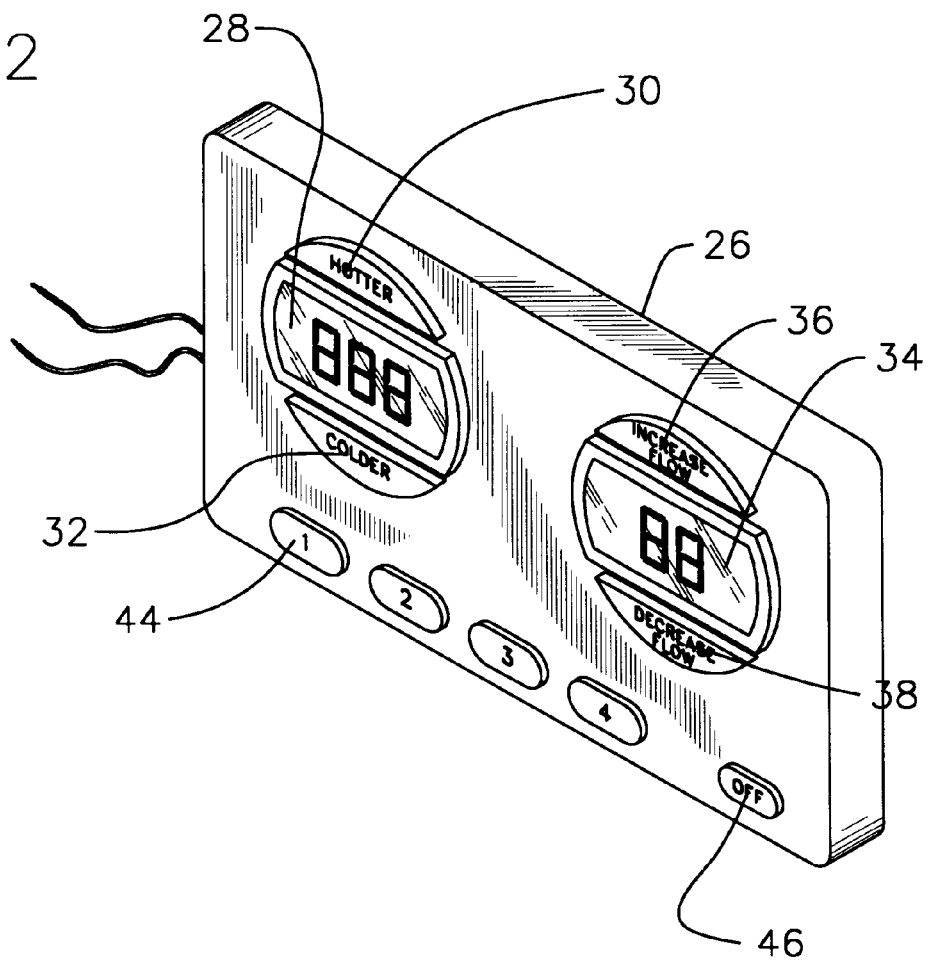
FIG. 2 is a perspective view of the housing of the present invention.

As shown in FIGS. 1 & 2, a housing 26 is provided having a rectilinear configuration with a front face, a rear face, and a periphery formed therebetween thereby defining an interior space. The housing is preferably mounted within the shower.

Situated on the front face of the housing is a temperature display 28 for displaying a plurality of numerals upon the receipt thereof. Such numerals are indicative of a temperature corresponding to a temperature signal. Situated adjacent the temperature display is a temperature increase switch 30. The temperature increase switch is adapted to transmit a temperature increase signal upon the depression thereof. Associated therewith is a temperature decrease switch 32 situated on the front face of the housing and adapted to transmit a temperature decrease signal upon the depression thereof.

Situated adjacent the temperature display is a flow rate display 34 for displaying a plurality of numerals upon the receipt thereof. Such numerals are indicative of a flow rate corresponding to a flow rate signal. Situated adjacent the flow rate display is a flow rate increase switch 36. The flow rate increase switch serves to transmit a flow rate increase signal upon the depression thereof. A flow rate decrease switch 38 is also situated on the front face of the housing and is adapted to transmit a flow rate decrease signal upon the depression thereof.

As shown in FIG. 2, each of the displays and associated switches together preferably have a circular configuration. As shown, the switches define an upper and a lower section of the defined circle with the corresponding display situated therebetween.

As shown in FIG. 3, a memory means 40 is provided. Such memory means is situated within the interior space of the housing and ideally takes the form of read only memory. During use, the memory means is adapted for storing a plurality of settings each consisting of a predetermined flow rate set signal and a predetermined temperature set signal. Associated therewith is a plurality of memory buttons 44 also situated on the front face of the housing. The memory buttons are included for transmitting an associated one of the settings stored within the memory means. As shown in FIG. 2, a deactivation button 46 is situated on the front face of the housing for transmitting a deactivation signal upon the depression thereof.

Finally, a control means 48 is connected between the water valves, temperature sensor, flow rate sensor, displays, increase switches, decrease switches, memory means, memory buttons, and deactivation button. During use, the control means is adapted to actuate the water valves upon the depression of at least one of the memory buttons. After such actuation, the control means governs the water valves to control the flow rate of water through the water valves such that a temperature and a flow rate represented by the current temperature signal and current flow rate signal, respectively, are equal to a temperature and a flow rate represented by the predetermined temperature set signal and the predetermined flow rate set signal associated with the settings of the memory button depressed. To accomplish the foregoing task, the control means essentially adjusts the proportion of the water flow rates to control the temperature and further the sum of the water flow rates to control the flow rate, or pressure.

After the actuation of the water valves, the control means is further adapted to control the flow rate of water through the water valves in a manner similar to that discussed hereinabove upon the receipt of the temperature increase signal and the flow rate increase signal. The difference in such operation, however, is that a temperature and a flow rate represented by the current temperature signal and the current flow rate signal, respectively, is controlled via the valves to be greater than a temperature and a flow rate represented by the predetermined temperature set signal and the predetermined flow rate set signal associated with the settings of the memory button. It should be noted that the control means also functions to control the water valves so that a current temperature and flow rate are less than determined by the settings upon the receipt of the temperature decrease signal and the flow rate decrease signal.

Further during use, the control means ceases the actuation of the water valves upon the receipt of the deactivation signal, thereby allowing the ceasing of the water flow. Also, the current temperature signal and the current flow rate signal are transmitted to the temperature display and the flow rate display, respectively, continuously while the water valves are actuated.

Figure 5:
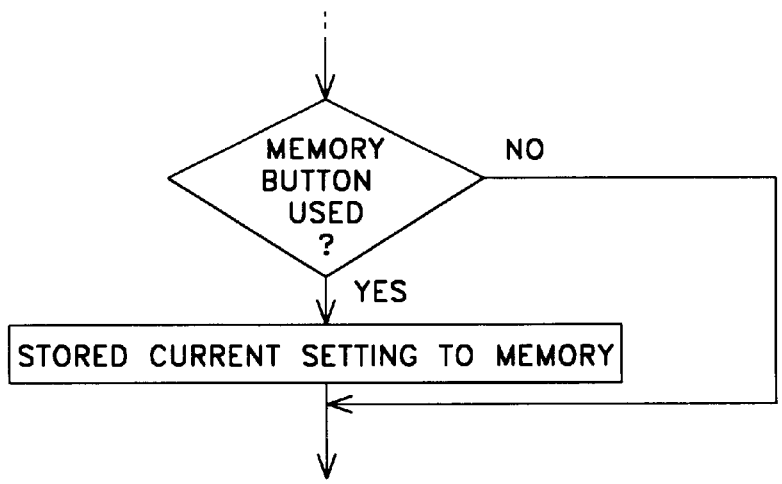
FIG. 5 is a flow chart depicting the storing operation of the memory buttons of the present invention.

As shown in FIG. 5, the settings of the memory buttons may be selectively determined by first actuating and controlling the water valves to afford the desired temperature and flow rate. Thereafter, an unillustrated record button and the desired memory button is depressed thereby storing the current temperature and flow rate signals as the set signals associated with the depressed memory button.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved shower temperature and flow rate memory controller comprising:

a hot water valve coupled to a hot water inlet line connected to a shower head of a shower for allowing a controlled rate of flow of hot water to the shower head upon the actuation thereof;

a cold water valve coupled to a cold water inlet line connected to the shower head of the shower for allowing a controlled rate of flow of cold water to the shower head upon the actuation thereof;

a single temperature sensor coupled to a main inlet line connected to the shower head down stream of the water valves, the temperature sensor adapted to generate a current temperature signal indicative of a temperature of water within the main inlet line;

a single flow rate sensor coupled to the main inlet line connected to the shower head down stream of the water valves, the flow rate sensor adapted to generate a current flow rate signal indicative of a flow rate of the water within the main inlet line;

a housing having a rectilinear configuration with a front face, a rear face, and a periphery formed therebetween thereby defining an interior space, the housing mounted within the shower;

a temperature display situated on the front face of the housing for displaying a plurality of numerals indicative of a temperature corresponding to a temperature signal upon the receipt thereof;

a temperature increase switch situated on the front face of the housing and adapted to transmit a temperature increase signal upon the depression thereof;

a temperature decrease switch situated on the front face of the housing and adapted to transmit a temperature decrease signal upon the depression thereof;

a flow rate display situated on the front face of the housing laterally spaced from, and inwardly adjacent to, the temperature display for displaying a plurality of numerals indicative of a flow rate corresponding to a flow rate signal upon the receipt thereof;

a flow rate increase switch situated on the front face of the housing and adapted to transmit a flow rate increase signal upon the depression thereof;

a flow rate decrease switch situated on the front face of the housing and adapted to transmit a flow rate decrease signal upon the depression thereof;

a read only memory unit situated within the interior space of the housing for storing a plurality of settings, with each setting consisting of a predetermined flow rate set signal and a predetermined temperature set signal;

a plurality of memory buttons situated on the front face of the housing and adapted to transmit an associated one of the settings stored within the memory means;

a deactivation button situated on the front face of the housing for transmitting a deactivation signal upon the depression thereof; and control means connected between the water valves, temperature sensor, flow rate sensor, displays, increase switches, decrease switches, memory means, memory buttons and deactivation button, the control means adapted to actuate the water valves upon the depression of at least one of the memory buttons and further control the flow rate of water through the water valves such that a temperature and a flow rate represented by the current temperature signal and current flow rate signal, respectively, are equal to a temperature and a flow rate represented by the predetermined temperature set signal and the predetermined flow rate set signal associated with the settings of the memory button depressed, whereby upon the actuation of the water valves, the control means is further adapted to control the flow rate of water through the water valves such that a temperature and a flow rate represented by the current temperature signal and the current flow rate signal, respectively, are greater than a temperature and a flow rate represented by the predetermined temperature set signal and the predetermined flow rate set signal associated with the settings of the memory button upon the receipt of the temperature increase signal and the flow rate increase signal, respectively, and further whereby the control means is adapted to control the flow rate of water through the water valves such that a temperature and a flow rate represented by the current temperature signal and the current flow rate signal, respectively, are less than a temperature and a flow rate represented by the predetermined temperature set signal and the predetermined flow rate set signal associated with the settings of the memory button upon the receipt of the temperature decrease signal and the flow rate decrease signal, respectively;

said control means further adapted to cease the actuation of the water valves upon the receipt of the deactivation signal and further transmit the current temperature signal and the current flow rate signal to the temperature display and the flow rate display, respectively.

* * * * *